United States Patent

[11] 3,603,601

[72] Inventors Walter Blomeyer
Wolfgang;
Peter Saul, Lauterbach (Hessen), both of,
Germany
[21] Appl. No. 858,665
[22] Filed Sept. 17, 1969
[45] Patented Sept. 7, 1971
[73] Assignee Vickers-Zimmer Aktiengesellschaft
Planung und Bau von Industrieanlagen
Frankfurt (Main), Germany
[32] Priority Sept. 17, 1968
[33] Germany
[31] P 17 75 727.6

[54] METALLIC RUBBING RING SEAL FOR
ROTATABLE SHAFT PASSAGEWAYS IN
APPARATUS WHICH, DURING USE, CONTAIN
LIQUID MEDIA
3 Claims, 3 Drawing Figs.
[52] U.S. Cl................................................... 277/83,
277/173

[51] Int. Cl...................................................... F16j 15/34
[50] Field of Search........................................ 277/81, 83,
88, 173-176, 235 A

[56] References Cited
UNITED STATES PATENTS
2,776,851 1/1957 Heinrich...................... 277/83
2,938,758 5/1960 Phillips........................ 277/235 A
2,974,982 3/1961 Luenberger................. 277/83

Primary Examiner—Robert J. Smith
Attorney—Molinare, Allegretti, Newitt & Witcoff ABSTRACT: A liquidtight expandable metallic seal for a rotating shaft extending through the wall of an apparatus, said seal being interposed between opposed sealing surfaces in the wall and in a shoulder on the shaFt. The seal is made of spring metal and V-shaped in cross section with the free ends terminating in rubbing rings lying against the sealing surfaces. The center line of the V-shaped section is perpendicular to the axis of the shaft. By moving the shaft axially with respect to the wall, the space between the sealing rings may be adjusted to compress the expandable seal to compensate for wear.

PATENTED SEP 7 1971
3,603,601
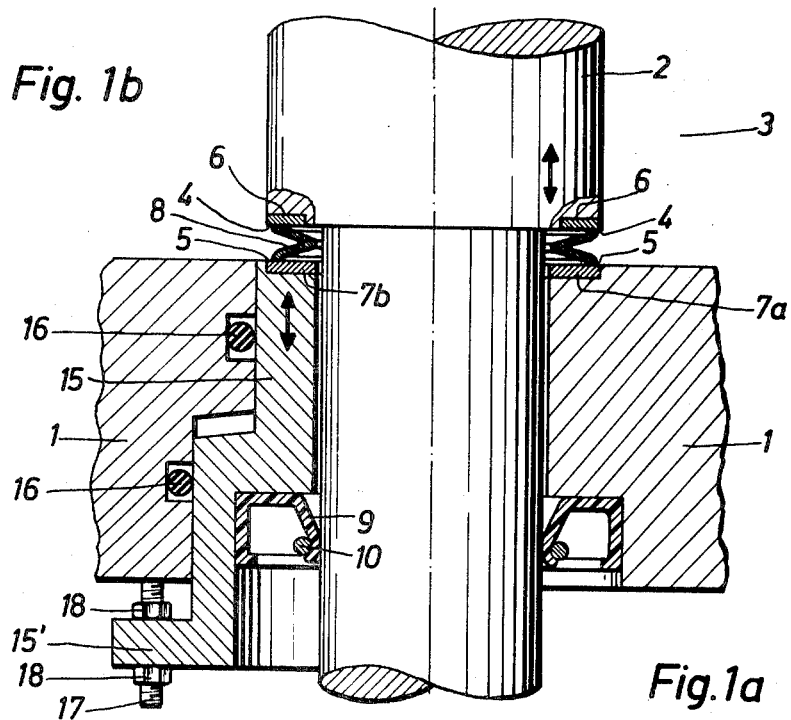
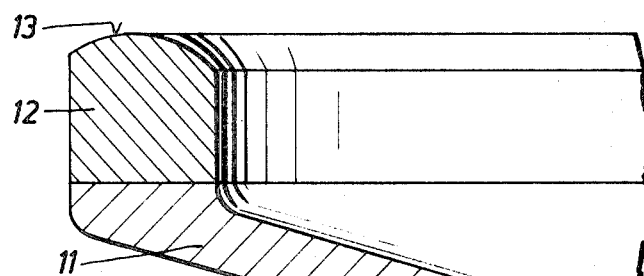
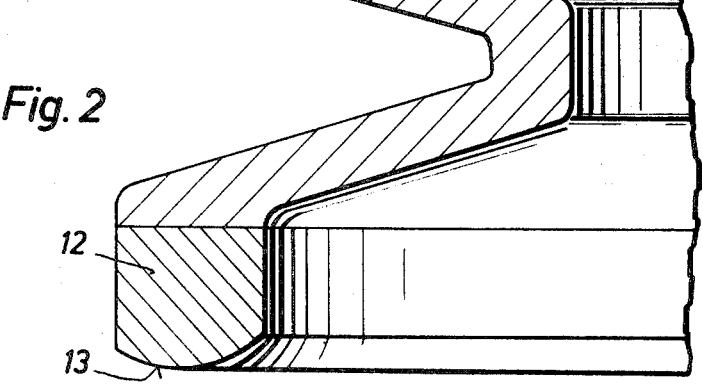
INVENTORS
WALTER BLOWMEYER & PETER SAUL
BY
Bair Freeman & Molinare

METALLIC RUBBING RING SEAL FOR ROTATABLE SHAFT PASSAGEWAYS IN APPARATUS WHICH, DURING USE, CONTAIN LIQUID MEDIA

BACKGROUND OF THE INVENTION

The invention concerns a metallic rubber ring seal having a resilient annular body of V or U-shaped cross section, for a rotatable shaft passageway through a wall of an apparatus, e.g., a screw conveyor, a mixer of a reactor, which, during use, contains a liquid medium. The annular body is arranged to lie with its free edges facing sealing surfaces arranged on the shaft and the housing wall of the apparatus.

PRIOR ART

The sealing of shaft passageways by rubbing ring seals fabricated wholly from metal is known, an heretofore such seals have served mainly as seals against liquid media. However, since these seals, as a rule, show insufficient gas tightness, it is obviously frequently necessary to combine metal rubbing ring seals with similar seals of plastic or rubber, etc.

A purely metal seal of V-shape cross section is disclosed in U.S. Pat. No. 2,913,269, and is made in one piece. The installation thereof, e.g., for sealing a shaft passageway, is carried out in such a way that one seal lip (i.e., the free end of one of the arms of the V or U) lies directly on the shaft and the other on the inside of the passageway in the housing. This seal may be used where not only rotary motion, but also axial displacement of the shaft occurs. Its installation is generally carried out self-sealingly, similarly to all those of this type made of plastic or rubber, i.e., the pressure to be sealed off acts to produce additional spreading of the V or U shaped sealing lips.

The efficiency of this metal seal is sufficient for short periods of service, but has given unacceptably high leak rates after longer operating times. The causes of this are, in certain cases, due to the occurrence of wear or to a decrease in the elasticity of the V-shaped seal and, as a result, a decreased pressure of the seal lips on the sealing surfaces of the shaft and the passageway through the wall. It may be noted that a decisive disadvantage is that there is no simple way of adjusting this type of metal seal, particularly during operation.

A wholly metal seal disclosed in German Registered Design 1,864,558, which can be installed for rotary shaft passageways is also nonadjustable. The seal consists of two V-shaped parts, namely, a plate spring and a seal ring. The seal ring is again installed in self-sealing manner and additionally is pressed against the sealing surfaces, one of which is situated axially on the shaft and the other radially around the inside of the passageway in the housing, by means of the pretension supplied from the plate spring. The advantage of this metal seal lies principally in its simplified manufacture and reliable assembly. Since, However, subsequent adjustment of the plate spring tension is impossible, this metallic rubbing ring seal also leads to unacceptably high leakage losses after long operating periods.

SUMMARY OF THE INVENTION

It is therefore the object of the invention to produce a V or U-shaped resilient, metal seal for rotating shaft passageways, which is simple to install and, with respect to its sealing action, is operationally reliable over long periods.

According to the invention, there is provided a metallic rubbing ring seal for a rotatable shaft passageway through a wall of an apparatus housing which, during use, contains a liquid media, said seal comprising a resilient annular body of V or U-shaped cross section provided, at its free ends, with rubbing rings, said annular body being adapted to lie against the shaft and the housing wall of the apparatus with its free ends facing each other, with the center line of its V or U-shaped section perpendicular to the axis of the shaft, with the rubbing rings extending parallel to the shaft axis, with one of the rubbing rings lying against a sealing surface of the housing wall and with the other of the rubbing rings lying against a sealing surface of the shaft, said surfaces being perpendicular to the shaft axis.

The invention also provides an apparatus comprising a housing provided with a passageway in one of its walls, through which a rotatable shaft extends and a housing wall sealing surface, a shaft-sealing surface and a metallic rubbing ring seal in accordance with the invention. Suitably, the rubbing rings have convex rubbing surfaces.

The rubbing ring seal according to the invention is axially effective. This leads immediately to the advantage that the sealing pressure between the rubbing ring and the sealing surfaces is adjustable by means of a simple axial relative displacement of the shaft sealing surface with respect to the wall-sealing surface. In this way, with increasing time of operation—if necessary without interrupting operation—the rubbing ring seal can be adjusted without dismantling the shaft or any of the seal components. This is particularly advantageous when rubbing ring seals of the invention are used in apparatus such as part of a process plant, in which any such dismantling would lead to a stoppage of the whole process.

The relative displacement of the sealing surfaces of the shaft and the wall can be produced in different ways. In the simplest case, the wall sealing surface is arranged directly on the wall of The housing and the shaft has limited axial adjustability. Where axial adjustment of the shaft is not permissible, however, the wall sealing surface may be arranged on a special sealing housing which is inserted in The wall passageway concentrically with the shaft and is itself axially adjustable.

A further advantage of the invention resides in the simple installation of the seal. If the shaft and wall sealing surfaces running perpendicularly to the shaft axis are made sufficiently wide, then as a rule no costly centering guide is required for the annular body. The installation of the seal is carried out using a certain prestressing and suitably in a known self-sealing fashion.

With respect to the manufacture of the shaft and wall-sealing surfaces, it is to be particularly emphasize that it is essentially simpler and less costly to manufacture shaft and wall surfaces which run perpendicularly to the shaft axis, than it is to manufacture seal surfaces running parallel to the axis of the known radially acting rubbing ring seals. Thus, for example, it is particularly easy, as well as most suitable to fabricate these sealing surfaces running perpendicular to the shaft axis from a suitable special material, in the form of annular flat bodies which can then be fixed in correspondingly preformed grooves or otherwise, in a shaft shoulder and in the housing wall or sealing housing. This can only be carried out for radially acting seals at very much increased cost.

If the sealing surfaces are manufacture from a special material, then it is particularly preferred to fabricate the rubbing rings of the annular body from a suitable counter-material with corresponding rubbing properties, e.g., from a wear-resistant Co-Cr-W alloy. The annular body itself which must have special elastic properties, is then suitably constructed from a steel proper, or a specially suitable corrosion-resistant alloy. This makes possible in an especially advantageous manner, the optimum adaption of each part of the rubbing ring seal to its function.

DETAILED DESCRIPTION OF THE INVENTION

Further features of the invention are described below with reference to the drawings in which:

FIGS. 1a and 1b as sectional views showing two possible constructions using a rubbing ring seal according to the invention.

FIG. 2 is a section on a larger scale, of a rubbing ring seal according to the invention.

In the two constructions shown together in FIGS. 1a and 1b, a shaft 2 passes through a wall 1 from an external space into a product space 3 filled with a liquid medium, and is sealed rotatably against the product space 3 in the region of the passageway through the wall.

For this purpose, a sealing surface 4 running perpendicularly to the shaft axis is provided on the shaft 2, and, in a particularly suitable embodiment, is formed by an annular flat body 6, incorporated in a shaft collar or shoulder. The annular flat body 6 can thereby be prefabricated from a special material different from that of the shaft.

In corresponding fashion, a sealing surface 5 is provided on the side of the wall running perpendicularly to the shaft axis and constructed from an annular flat body 7a (FIG. 1a ) or 7b (FIG. 1b) suitably also consisting of a special material.

Between the sealing surfaces 4 and 5 is arranged a ring seal having a body 8 of V-shaped cross section the centerline of which is perpendicular to the shaft axis. Naturally, a U-shaped or similar cross section with resilient properties is also suitable. Advantageously, the annular body 8 should always have the open ends of the V or U-shaped cross sections pointing in the direction of the high pressure, since a "self-sealing" pressure of the free edges of the annular body 8 is thereby applied to the sealing surfaces 4 and 5.

In FIG. 1a, A, sealing surface 5 formed by the annular flat body 7a is fixed firmly to the wall, while in FIG. 1b, the annular flat body 7b forming the sealing surface 5, is situated in a special sealing 15 housing concentrically surrounding the shaft 2. A different type of tension in the annular seal body 8 thereby results in these two constructions both on installation and on adjustment. In the case of FIG. 1a, the tension results from an axial displacement of the shaft 2 to the wall 1. In the case of FIG. 1b, on the other hand, the shaft remains in an unchanged position during stressing of the annular seal body 8 and the seal housing 15 instead is adjustable relative to the shaft. For this purpose, the sealing housing 15, which is suitably sealed against the wall 1 by a conventional rubbing seal or O ring 16, may be provided with a flange 15' at its outer end, held adjustably against the wall 1 by threaded rods 17 and nuts 18.

It should be noted, that, as a rule, this shaft seal of the invention by itself possesses insufficient gas tightness. Therefore, a cup seal of known construction is provided in the shaft passageway shown in FIGS. 1a and 1b, and is lodged in a recess in wall 1 (FIG. 1a ) or on a shoulder of the seal housing 15 (FIG. 1b). This cup seal, which is formed from a soft material, e.g., rubber or plastic, and can be secured in normal fashion by a coil spring 10, may advantageously be arranged on the side of the wall 1 facing away from the product space.

Advantages of this arrangement in which the lips are on the atmospheric side of the wall are that in contrast to the metallic sealing rings, can be easily lubricated, and that the lips are situated in the most favorable temperature zone with respect to the product space, i.e., the zone of lowest temperature in which their function can be fully exploited. This makes it possible to use rubbing ring seals according to the invention in a region the temperature of which depending on the selection of the materials of construction, extends downwardly form 20° C. to 200° C. or more and upwardly to about 600° C. or even 800° C.

FIG. 2 shows on an increased scale, a section of a metallic rubbing ring seal according to the invention. The annular body 11 of V-shaped section has a rubbing ring 12 extending parallel to the shaft axis, on its free edges. These rubbing rings have convex rubbing surfaces 13. The term "convex" is intended to include any nonplanar profile, e.g., an angular or circular profile, which will ensure that a line contact is produced between the rubbing surface and the sealing surface when the seal is installed under a suitable desired pretension or else after adjustment, i.e., tensioning of the seal.

The annular body 11 of the rubbing ring seal shown in FIG. 2 is advantageously manufactured separately from the rubbing rings 12. An optimum adaptation of parts 11 and 12 for their function results thereby. The annular body 11 which must have resilient properties is suitably fabricated from a special corrosion-resistant, spring steel and the rubbing rings 12, because of their rubbing function, are suitably made from a special wear-resistant alloy. The annular body 11 is then bonded to the two rubbing rings 12, e.g., by soldering or welding to produce a rubbing ring seal as shown in section in FIG. 2, which consists of a single piece with no moving parts and is therefore particularly simple to manipulate during the installation thereof in a rotating shaft passageway.

What we claim is:

1. An improved metalic rubbing ring seal for a rotatable shaft passageway extending through a wall of an apparatus housing which, during use, contains a liquid medium, the seal being positioned between, and forming a seal between, a shoulder on the shaft and a portion of the wall adjacent to the passageway, with the shaft and the portion of the wall being adjustably movable, axially with respect to the shaft, relative to each other, the improved seal comprising:

an annular, one-piece, spring steel body have a V or U-shaped cross section with an annular base portion and two spaced, resilient free end portions, the body being positioned about the shaft so that the base portion of the body is disposed adjacent to the shaft while the resilient, free ends of the body are spaced from the shaft, so that the radially outwardly facing, interior portion of the body between the free ends thereof is exposed to the liquid medium and so that the centerline of the V or U-shaped section of the body is perpendicular to the axis of the shaft;

first and second metallic rubbing rings, each having an annular, convex rubbing surface formed thereon, with the first rubbing ring being bonded to one of the free ends of the body and the second rubbing ring being bonded to the other of the free ends of the body and with first and second rubbing rings being disposed so that the axes of the first and second rubbing rings are coaxial to the axis of the shaft and so that the annular convex rubbing surfaces of the first and second rubbing seals are adapted to contact, along a line, the shoulder and the portion of the wall, respectively, with the axes of the line of contact between the rubbing surfaces of the first and second rubbing rings and the shoulder and the portion of the wall being coaxial to the axis of the shaft; the body being constructed and arranged so that the pressure of the liquid medium and the resilience of the free ends of the body causes the rubbing surfaces of the first and second rubbing rings to remain in contact with the shoulder and the portion of the wall, and so that relative movement of shaft and the portion of the wall toward each other, in a direction parallel to the axis of the shaft, permits facile compensation for wear on the rubbing surfaces of the first and second rubbing rings.

2. The combination as claimed in claim 1 in which the portion of the wall is formed by an annular flat body firmly bonded to the wall, and the shaft is axially adjustable.

3. The combination as claimed in claim 1 in which the portion of the wall is formed by an annular flat body firmly bonded to a sealing housing which is axially adjustable and is inserted in the passageway concentrically with the shaft.

* * * * *